Aug. 4, 1931.   L. M. SHOWERS, JR   1,817,170
TESTING MACHINE
Filed Dec. 16, 1929    3 Sheets-Sheet 2
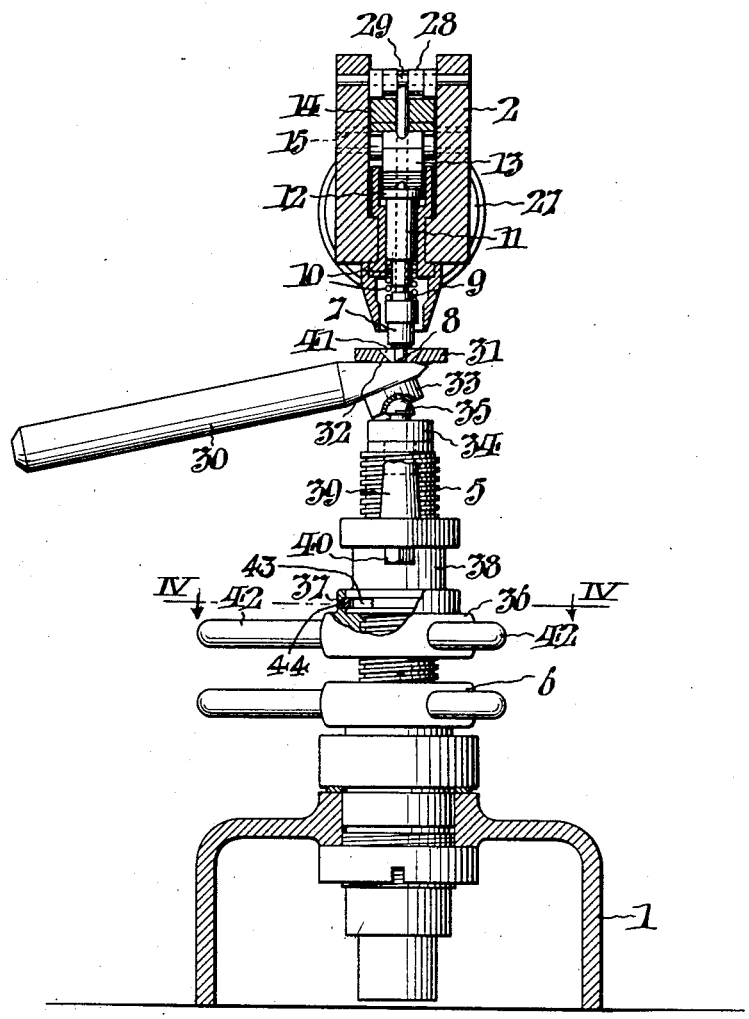
FIG. II.
WITNESSES
John A. Weidler
George M. Murchamp
INVENTOR:
Lewis M. Showers, Jr.,
BY Fraley Paul
ATTORNEYS.

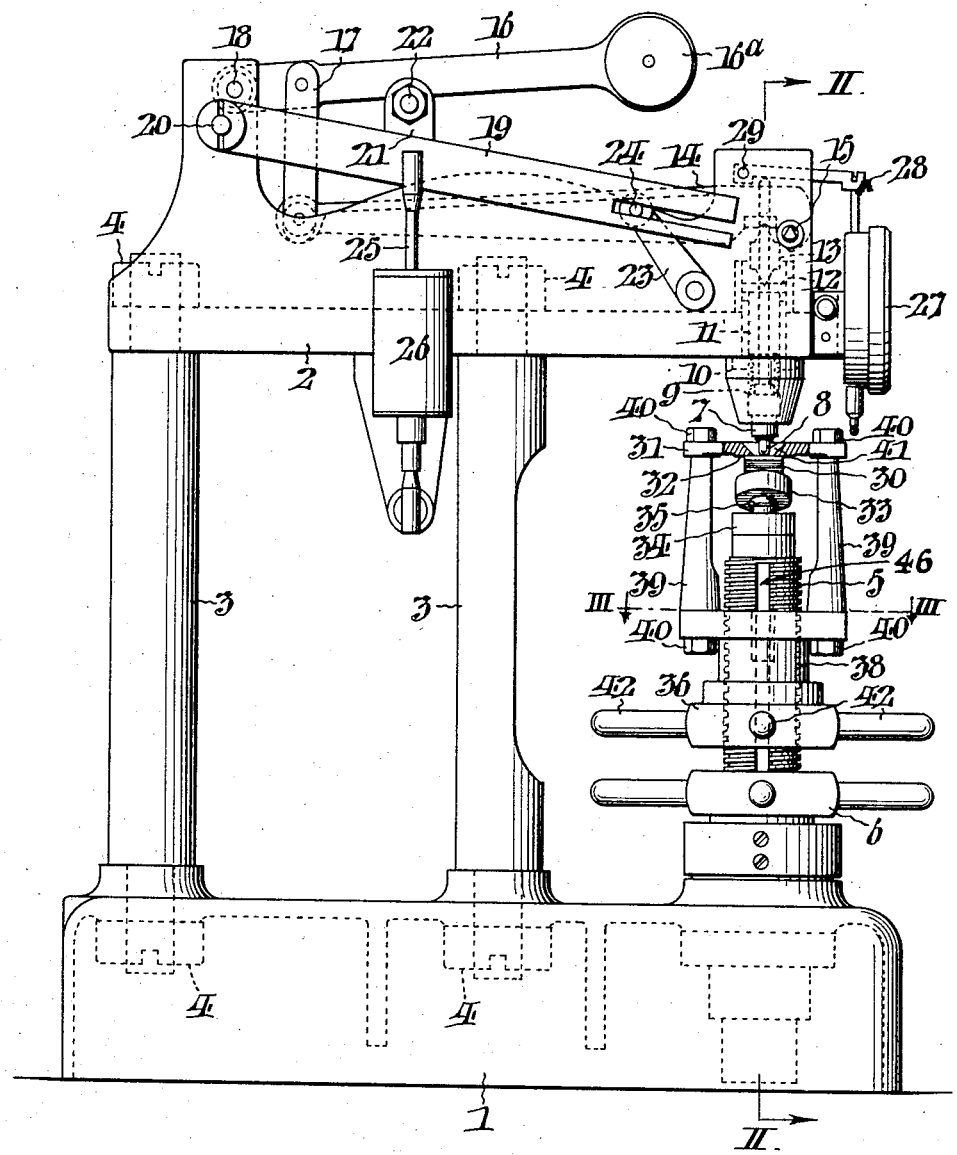

Aug. 4, 1931.  L. M. SHOWERS, JR  1,817,170
TESTING MACHINE
Filed Dec. 16, 1929  3 Sheets-Sheet 3
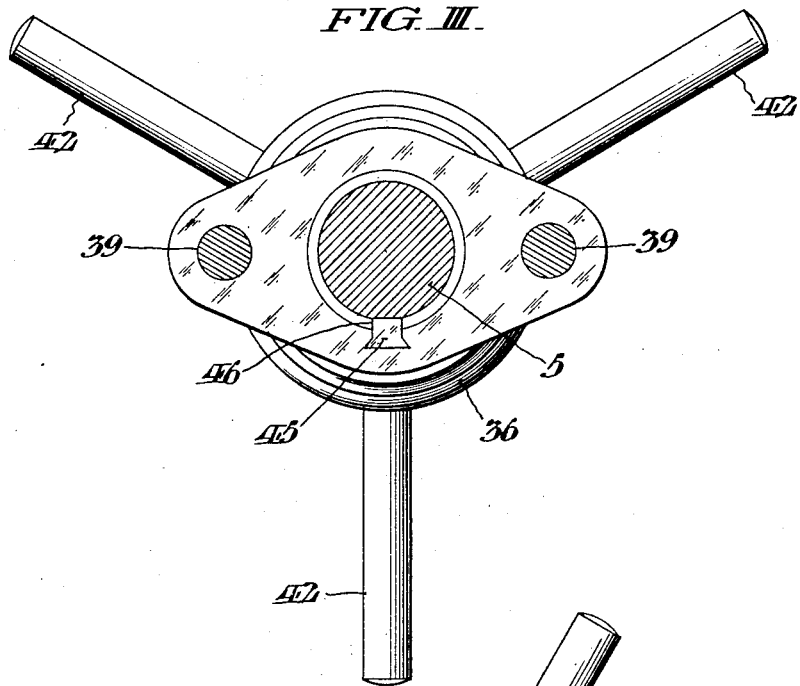
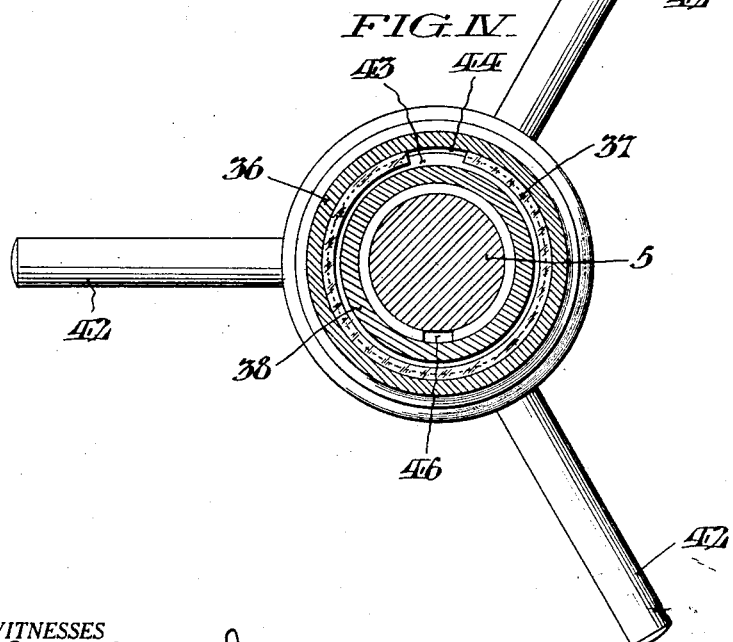

Patented Aug. 4, 1931

1,817,170

UNITED STATES PATENT OFFICE

LEWIS M. SHOWERS, JR., OF JUNIATA, PENNSYLVANIA

TESTING MACHINE

Application filed December 16, 1929. Serial No. 414,304.

My invention relates to testing machines and more particularly to machines for testing hardness of metals by penetration. The invention has for its object the provision of improved means for holding the object to be tested, and it is particularly characterized by a novel arrangement of parts including opposed clamp members between which tools or other objects of irregular shape, such as chisels are accommodated. More specifically, the clamp members are so arranged that one of them is fixed with relation to the axis of the testing or penetrating point, whereas the other clamp member has capacity for universal motion in adjusting itself to the inclination of the surface of the work to be tested incident to gripping the same. Though capable of angular movement with respect to each other, the clamp members are so arranged that they are at all times maintained in line with the axis of the testing point.

Further objects and advantages of the invention will be apparent from the detailed description which follows and which has reference to the accompanying drawings, wherein I have illustrated a preferred embodiment of the invention.

Of the drawings:

Fig. I is a side elevation of a machine for testing hardness of material, embodying the improvements of my invention.

Fig. II is a sectional view of the machine of Fig. I taken along the lines II—II of Fig. I.

Fig. III is an enlarged cross-section taken as indicated by the lines III—III of Fig. I; and Fig. IV is an enlarged cross-section taken as indicated by the lines IV—IV of Fig. II.

The invention as illustrated is adapted to a type of testing machine now in common use and known as the Rockwell hardness tester. Inasmuch as the improvements claimed herein are only directed to the means which are employed for clamping and holding the object to be tested, the machine in its entirety need only be briefly described.

With particular reference to Fig. I, the machine as illustrated comprises a base 1 and an overhanging support 2 mounted on pillars 3, the threaded ends of which are held by nuts 4. In the base 1 there is provided an elevating screw 5 which serves as the work supporting means and which is vertically movable toward or away from the testing point by means of a nut 6 having the form of a hand wheel. The elevating screw 5 is keyed to the base 1 so that it is capable of vertical movement but not rotative movement. In line with the elevating screw 5, and mounted directly overhead, is a testing rod 7, on the end of which a testing point 8 is provided. The head of the testing rod 7 is flanged at 9 to engage one end of a spring 10. The other end of the spring 10 bears upon a sleeve 11 which has a flanged upper end 12 receiving the lower knife edge of a double-knife-edged block 13.

Supported on the upper knife edge of the block 13 is a testing lever 14 fulcrumed on the support 2 at 15. Movement of the testing lever 14 is communicated through the block 13, the sleeve 11 and the spring 10 to the testing point 8. The lever 14 is in turn connected to an additional lever 16 by means of a link 17. The lever 16 serves as a weight arm, carrying at its outer end a weight 16a, and the lever 16 is fulcrumed at 18 on the support 2. To lift the lever or weight arm 16, a lifting lever 19 is provided. This lever 19 is fulcrumed at 20 and carries on a support 21 a transverse lifting pin 22 adapted to normally support the weight arm 16 in the position in which it is shown. To operate the lifting lever 19 a crank 23, having a pin 24 extending into the slotted end of the lifting lever 19, is employed. The crank 23 is turned by means of a crank handle which is not shown. On the lifting lever 19 there is also provided a rod 25 with a piston thereon within a dash pot 26 which is affixed to the support 2.

There is also mounted on the support 2 a measuring gauge 27, the pointer of which denotes the degree of movement of the testing point 8. The gauge 27 is actuated by means of a lever 28 fulcrumed at 29 and mounted directly above the testing rod 7, the upper end of which is adapted to bear upon the lever 28 to transmit to the gauge pointer an angular movement proportionate to the lineal movement of the testing rod 7.

The machine as thus far described contains no novel elements and conforms to a standard type of hardness testing machine now in use.

To hold the work—a chisel 30 is shown as the object to be tested—I employ opposed clamp members, the upper one 31 being always maintained with its work engaging roughened surface 32 in a plane at right angles to the axis of the testing point 8, and the lower clamp member 33 being pivotally mounted on a pin 34 provided with a hemispherical head 35 and fitting in the upper end of the elevating screw 5. On the elevating screw there is also provided means for moving the upper clamp member 31 toward or away from the testing point 8 comprising a nut 36, a shoulder of which is keyed by means of a ring 37 to a sleeve 38. It will be noted that, as shown in Fig. IV, the ring 37 is a split ring which is initially compressed from its normal shape to fit snugly within the annular groove 43 on the sleeve 38, so that the sleeve 38 and ring 37 may be inserted into the top of the nut 36, and, when so inserted, the ring 37 is expanded into the annular groove 44 at the top of the nut, forming a swivel joint between the nut 36 and sleeve 38. The sleeve 38 is in turn splined to the elevating screw 5 by means of a key 45 fitting within the vertical slot 46 in the screw 5, as shown in Fig. IV, so that rotative movement of the nut 36 moves the sleeve vertically with respect to the screw 5 but without rotation. The upper flanged end of the sleeve 38 carries the upper clamp member 31 spaced at a convenient distance therefrom by rods 39 and nuts 40, these parts forming a yoke through which the tool is inserted. Thus the upper clamp member 31 is guided in its vertical travel by the elevating screw 5 and is also at all times maintained in alignment with the axis of the testing point 8 which is adapted to pass through a central opening 41 in the member 31.

The nut 36 is provided for convenience with handles 42 which assist the operator in drawing together or apart the opposing clamp members 31 and 33 in a manner obvious from their description. As the clamp members 31 and 33 approach each other on opposite sides of the object 30 to be tested, the lower clamp 33 will adjust itself, by reason of its capacity for universal motion on the hemispherical head 35, to the angularity of the lower surface of the object 30, while the upper surface of the object 30 will be maintained in horizontal position by the upper clamp 31. Accordingly, the object 30, regardless of its irregularity, can be firmly gripped in the proper position directly beneath the testing point 8.

The operation of the machine consists in first clamping and positioning the object to be tested, by turning the handles 42 to draw the clamp members 31, 33 together about the object in the manner described; and then elevating the same by means of the hand wheel 6 until the object bears upon the testing point 8 and forces the testing rod 7 upward against the lever to actuate the gauge index pointer and move it to a predetermined point on the dial of the gauge. When the parts are in position for the application of the major pressure, that is applied by turning the handle (not shown) which operates the crank 23 thereby releasing the lifting lever from beneath the weight arm 16 and causing the full effect of the weight 29 to be exerted through the lever 16, the link 17, the lever 14, and the block 13 upon the sleeve 11 which is moved into contact with the shoulder 9 on the testing rod 7. Consequently the force of the weight is multiplied through the various levers described and transmitted to the testing point 8 which penetrates the object 30, the degree of penetration being measured by the movement of the gauge index pointer.

While I have described my invention in some detail and with reference to a particular embodiment thereof applied to a certain type of testing machine, it will be apparent to those skilled in the art that the invention may be equally well applied to other types of testing machines, and that various changes may be made in the form of the apparatus described and illustrated without departing from the spirit of the invention, as set forth in the claims appended hereto.

Having thus described my invention, I claim:—

1. In a testing machine of the character described including a testing point and a work-support movable toward the testing point, a yoke guided on said work support, means for moving the yoke toward the testing point, a clamp member carried on said yoke adjacent to the testing point with its work engaging surface in fixed relation to the axis thereof, and an opposed clamp member pivoted on said work support.

2. In a testing machine of the character described including a testing point and a work-support movable toward the testing point, a yoke guided on said work support, means for moving said yoke toward the testing point, a clamp member carried by said yoke having an opening permitting the passage of the testing point therethrough and having its work engaging surface at right angles to the axis of the testing point, and an opposed clamp member pivoted on said work support.

3. In a testing machine of the character described including a testing point and a work support movable toward the testing point, a yoke keyed to said work support, means for moving said yoke toward the testing point, a clamp member carried on said yoke adjacent to the testing point with its work engaging surface in fixed relation to the axis thereof, and an opposed clamp member pivoted for universal movement on said work support.

4. In a testing machine of the character described including a testing point and a screw serving as a work support movable toward the testing point, a yoke having a portion in the form of a nut on said screw, a clamp member carried on said yoke adjacent the testing point with its work engaging surface at right angles to the axis thereof, and an opposed clamp member pivoted on said work support.

5. In a testing machine of the character described including a testing point and a screw serving as a work support and movable toward the testing point, a nut on said screw, a sleeve, a swivel joint connecting said nut and sleeve, means for holding said sleeve against rotation, a clamp member carried on the sleeve adjacent to the testing point, and an opposed clamp member on said screw.

6. In a testing machine of the character described including a testing point and a screw serving as a work support and movable toward the testing point, a nut on said screw, a clamp member carried on said nut adjacent the testing point with its work engaging surface at a fixed angle to the axis thereof, and an opposed clamp member pivoted on said screw with capacity for angular movement to adjust itself to the inclination of the surface of the work to be tested.

In testimony whereof, I have hereunto signed my name at Altoona, Pennsylvania, this 5th day of December, 1929.

LEWIS M. SHOWERS, Jr.